Sept. 11, 1923.

C. S. WHITE

FILTER

Filed March 27, 1922

1,467,663

Inventor

C. S. White

By William C. Linton.

Attorney

Patented Sept. 11, 1923.

1,467,663

UNITED STATES PATENT OFFICE.

CHARLES SCRIBNER WHITE, OF COUPEVILLE, WASHINGTON.

FILTER.

Application filed March 27, 1922. Serial No. 547,234.

*To all whom it may concern:*

Be it known that I, CHARLES SCRIBNER WHITE, a citizen of the United States of America, residing at Coupeville, in the county of Island and State of Washington, have invented certain new and useful Improvements in Filters; and I do hereby declare that the following is a full, clear, concise, and exact description of the invention, such as will enable others skilled in the art to which it appertains to make and use the same.

This invention relates to improvements in filtering devices such as illustrated and described in my United States patent numbered 536,364, having for an object to provide a filter for removing various foreign matter or impurities from liquid fuel, such for example, as gasoline, prior to its delivery to a heating or illuminating burner or the charge forming device of an internal combustion engine from the source of fuel supply therefor.

It is likewise an object of the invention to provide a device of the character mentioned employing a novel form of filtering or straining means for the liquid fuel passing therethrough, the same being of laminated formation and having such laminations positively interengaged and retained as a unitary element in position within the casing of the filter between the inlet and outlet connections thereof, but when desired, being readily removed and disassembled for cleaning or replacing of any of its parts.

Other objects will be in part obvious and in part pointed out hereinafter.

In order that the invention and its mode of operation may be readily understood by persons skilled in the art, I have in the accompanying illustrative drawings and in the detailed following description based thereon, set out one possible embodiment of the same.

Figure 1:
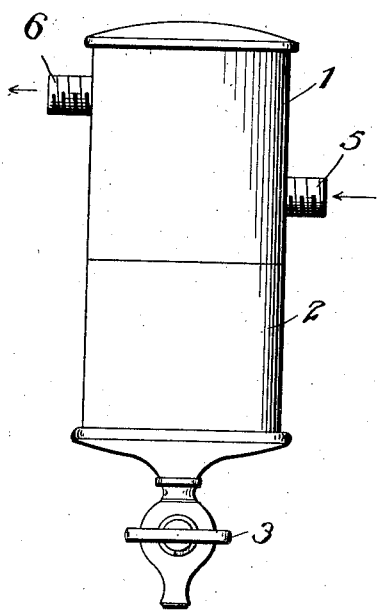
Figure 1 is a side elevation of the improved filter.
Figure 2:
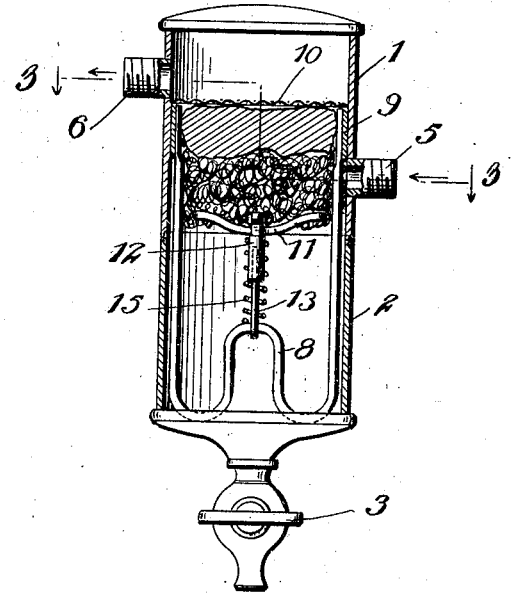
Figure 2 is a vertical section therethrough.
Figure 3:
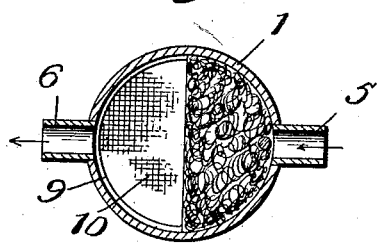
Figure 3 is a horizontal section through the same taken on the line 3—3 of Figure 2 looking in the direction in which the arrows point; and, Figure 4 is a fragmentary detail in elevation showing the improved follower.
Figure 4:
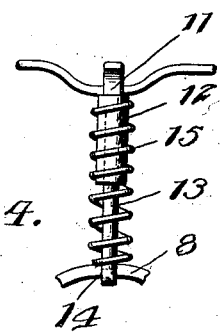

Having more particular reference to the drawings, in connection with which like characters of reference with designate corresponding parts throughout, the improved filter may be stated to comprise a hollow cylindrical casing comprising upper and lower sections 1 and 2, the adjacent portions of which are correspondingly screw threaded and adapted to be inter-fitted or coupled, whereby to constitute the cylindrical casing of the device, the bottom section 2 of the casing being provided with an inclined bottom leading to a drain opening formed therein into which a suitable type of valve or drain cock 3, said valve being provided with a handle portion 4 for an obvious purpose.

The upper end of the section 1 of the hollow cylindrical casing is closed while inlet and outlet connections are provided the same and are formed of screw threaded nipples 5 and 6 respectively, which as will be noted, are arranged in substantially diametrically opposed relation, the inlet connection 5 being positioned at a point in proximity to the bottom of the section 1, while the outlet connection 6 is positioned at a point in proximity to the closed upper end thereof.

It is of course to be understood that the sections 1 and 2 constituting the hollow cylindrical casing of the filter may be formed of sheet metal or various material such as conditions or preference may dictate.

Positioned within the hollow cylindrical casing 1 is a vertically disposed wire holder 7, consisting of a single length of sufficiently rigid wire bent or curved upwardly as indicated at 8, whereby to provide a pair of oppositely disposed supporting feet which as will be noted, rest or engage upon the inclined bottom of the lower section of the filter casing; the upper or free ends of this wire holder extending to a point in proximity to the outlet connection 6 or specifically, being arranged in that space occurring between the inlet and outlet connections 5 and 6 respectively, whereat, such ends are flattened and engage at approximately diametrical points with a circular sheet metal band or frame 9, the diameter of which is such as to ensure of its snug reception in that portion of the section 1 of the filter housing between the inlet and outlet connections 5 and 6.

Arranged over and secured at its outer portions to the upper marginal portions of the circular frame 9 is a strainer or screen 10 of a sufficiently fine gauge for positively removing any foreign matter or impurities passing through the porous straining or filtering material hereinafter more fully described, during flow of the liquid fuel into the casing of the filter by way of the connection 5 and from the same by way of the outlet connection 6.

With a view towards providing means for effecting positive filtering or straining of the liquid fuel being purified with the aid of the invention, I provide a primary filtering or straining means, including alternately arranged layers of porous material, such for example, as a layer of sheet cotton and a layer of cork above the same.

To retain the layers of porous material which are snugly received in the circular frame 9 in their assembled relation and to render the same substantially unitary, I provide a follower element 11, comprising a body portion having a plurality of arms extending radially therefrom and adapted to be engaged with adjacent portions of that particular layer of porous material exposed thereto, a depending sleeve 12 being fixedly arranged in an opening formed in the central body portion of the follower 11 and telescopically receiving therein the upper portion of a rod 13, secured at its lower end, as at 14, to the upper extremity of the curved lower portion of the holder 8. An expansible coiled spring 15 is arranged about the sleeve 12 and the exposed portion of the rod 13 and as will be noted, has bearing at its lower end upon an adjacent portion of the upwardly curved part of the holder 8 while the upper end thereof has bearing upon the central body portion of the follower 11, thus exerting an upward thrust or stress upon the follower 11 and by consequence, tending to move the same at all times upwardly into engagement with the lowermost layer of porous material constituting the primary strainer of the filtering device. By reason of the yieldable or spring like engagement of the follower 11 with the lower layer of the porous material of the primary strainer, it will be understood that the various laminations of which the same is composed will be positively retained in their assembled position thereby presenting a substantially unitary element; the uppermost layer of such filter, of course, engaging the lower side of the strainer 10 arranged over the upper marginal portions of the circular frame 9.

The positioning of the primary strainer in the circular frame 9 of the wire holder 8 is such that the same is interposed between the inlet and outlet connections 5 and 6 of the filter. Consequently, with flow of liquid fuel into the filter casing by way of the inlet connection 5, such liquid will be caused to ultimately pass through each and every porous lamination of the primary filter and lastly through the fine gauge strainer 10, from whence it flows from the filter casing by way of the outlet connection 6. Any foreign matter or impurities contained by the liquid fuel flowing into the filter casing from the inlet connection will be removed therefrom as the fuel passes through first the primary strainer and then the secondary strainer 10 to the outlet connection 6. Likewise, any liquid of greater specific gravity than the liquid fuel being filtered by the device will promptly descend into the lower section 2 of the casing 1 and will be retained therein until drained from the same by opening the valve 3 tapped into the drain opening formed in the inclined bottom of the casing. With opening of this drain valve, such foreign matter collected during operation of the filter will be promptly removed from the casing of the same.

When it becomes necessary to clean or repair any of the active elements of the filter construction, the same may be readily accomplished by disconnecting the upper and lower sections 1 and 2, removing the holder 8 in order that the follower 11 may be disengaged from the porous laminations of the primary strainer and the latter then removed for cleaning or replacing as necessary.

It is to be expressly understood, that the use of the improved filter may be varied, that is, the device may be employed in connection with fuel feeding lines to various devices, such for example as heating or illuminating burners, or the charge forming devices or carburettors of internal combustion engines. To adapt the filter to the fuel feeding line of a fuel consuming device, it is only necessary that the screw threaded connections or nipples 5 and 6 be tapped into the opposite sides of such line, thus interpositioning the filter therein.

Manifestly, the construction shown is capable of considerable modification and such modification as is within the scope of my claims, I consider within the spirit of my invention.

I claim:

1. A filter comprising a casing having opposed inlet and outlet connections and a drain in its bottom, a holder within and resting upon the bottom of the casing, a circular frame supported on the upper end of the holder, a strainer arranged over and secured to the upper marginal portions of the frame, porous material within the frame abutting the strainer, and means supported upon the holder engaging the porous material for yieldably retaining the same in the circular frame and engaging said strainer.

2. A filter comprising a casing having opposed inlet and outlet connections and a drain in its bottom, a holder arranged within and resting upon the bottom of the casing, a circular frame supported upon the upper extremity of said holder positioned between the inlet and outlet connections, a strainer arranged over and secured to the upper marginal portions of the frame, layers of porous material within the frame abutting the strainer, and means supported upon the holder engaging the porous layers of material for yieldably retaining the same in the circular frame in assembled relation and engaging said strainer.

3. A filter comprising a casing composed of interengageable upper and lower sections, the upper end of said upper section being closed, the bottom of said lower section having a valve controlled drain therein, inlet and outlet connections arranged in opposed relation adjacent the upper and lower portions of said upper sections, a holder arranged within and resting upon the bottom of the casing, a circular frame supported upon the upper end of said holder positioned in that space occurring between the inlet and outlet connections of said upper section, a strainer arranged over and secured to the upper marginal portions of the frame, layers of porous material arranged within the frame abutting the strainer, and means supported upon the holder engaging the lowermost layer of porous material for yieldably retaining such sheets of material in assembled relation in the circular frame and engaging said strainer.

4. A filter comprising a casing composed of interengageable upper and lower sections, the top of said upper section being closed and the bottom of said lower section having a valve controlled drain opening therein, opposed inlet and outlet connections formed on the upper section in proximity to the upper and lower extremities thereof, a holder arranged within and resting upon the bottom of the casing, a circular frame supported on the upper end of said holder occupying that space occurring between the inlet and outlet connections of the upper section, a strainer arranged over and secured to the upper marginal portions of the frame, alternate layers of different characters of porous material received in said frame and abutting the strainer, a follower engaging the lowermost layer of porous material having a depending sleeve extending concentrically therefrom, a rod secured at its lower end to the intermediate portion of said holder telescopically engaged in said sleeve, and an expansible coiled spring arranged about said sleeve and rod having bearing upon adjacent portions of said follower and holder for exerting an upward thrust upon the former as and for the purpose set forth.

In witness whereof I have hereunto set my hand.

CHARLES SCRIBNER WHITE.